United States Patent [19]

Oyama et al.

[11] E Patent Number: Re. 31,906

[45] Reissued Date of Patent: Jun. 4, 1985

[54] CONTROL SYSTEM FOR INTERNAL COMBUSTION ENGINE

[75] Inventors: Yoshishige Oyama; Teruo Yamauchi; Yutaka Nishimura, all of Katsuta, Japan

[73] Assignee: Hitachi, Ltd., Tokyo, Japan

[21] Appl. No.: 382,692

[22] Filed: May 27, 1982

Related U.S. Patent Documents

Reissue of:

[64] Patent No.: 4,205,377
Issued: May 27, 1980
Appl. No.: 899,159
Filed: Apr. 24, 1978

[30] Foreign Application Priority Data

Apr. 22, 1977 [JP] Japan ..... 52-45795

[51] Int. Cl.[3] ..... G06F 15/20; F02D 33/00

[52] U.S. Cl. ..... 364/431.06; 73/204; 123/480; 123/489; 123/494

[58] Field of Search ..... 364/431.04, 431.05, 364/431.06; 123/475, 480, 483, 484, 485, 486, 494, 589; 73/204

[56] References Cited

U.S. PATENT DOCUMENTS

| | | | |
|---|---|---|---|
| 3,372,590 | 3/1968 | Sterling | 73/204 |
| 3,747,577 | 7/1973 | Mauch et al. | 123/494 |
| 3,891,391 | 6/1975 | Boone | 73/204 |
| 3,969,614 | 7/1976 | Moyer et al. | 364/431.06 |
| 3,975,951 | 8/1976 | Kohama et al. | 73/204 |
| 3,986,006 | 10/1976 | Kawai et al. | 364/431.05 |
| 3,991,727 | 11/1976 | Kawai et al. | 364/431.06 |
| 4,016,759 | 4/1977 | Baker et al. | 73/204 |
| 4,043,195 | 8/1977 | Hunting | 73/204 |
| 4,058,089 | 11/1977 | Schmidt et al. | 123/494 |
| 4,067,233 | 1/1978 | Obayashi et al. | 123/475 |
| 4,084,563 | 4/1978 | Hattori et al. | 123/589 |
| 4,089,214 | 5/1978 | Egami et al. | 73/204 |
| 4,121,545 | 10/1978 | Mizote | 123/485 |
| 4,176,629 | 12/1979 | Kawai et al. | 123/486 |
| 4,184,460 | 1/1980 | Harada et al. | 123/483 |

FOREIGN PATENT DOCUMENTS 2448304 4/1976 Fed. Rep. of Germany ... 123/32 EJ

OTHER PUBLICATIONS

Datametrics Bulletin: Heated Sensor Finds Wide Applications in Fluid Flow Measurements, Publication of 1971.

*Primary Examiner*—Felix D. Gruber
*Attorney, Agent, or Firm*—Antonelli, Terry & Wands

[57] ABSTRACT

A control system including a microprocessor for controlling the controlled variables of an internal combustion engine, especially, the flow rate of fuel is disclosed. An air flow meter provides an output signal having such a non-linear characteristic relative to the flow rate of intake air that the signal level increases in the region of the small flow rate of intake air. The microprocessor carries out necessary digital computation on the basis of the output signal of the air flow meter to provide a fuel flow rate control signal. This digital control signal is converted into a signal having a linear characteristic proportional to the flow rate of intake air, or after having been produced from the microprocessor, converted into a signal including information proportional to the flow rate of intake air.

14 Claims, 19 Drawing Figures

CONTROL SYSTEM FOR INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

This invention relates to a system for controlling an internal combustion engine, and more particularly to a control system in which the signals representing the amount of air supplied to an internal combustion engine, the temperature of the engine, the rotating speed of the engine, the load of the engine, and the composition of exhaust gases from the engine are processed by a microprocessor to obtain various control signals so that these control signals can be used for the control of the controlled variables of the engine, especially, for the control of the amount of fuel supplied to the engine.

A known disclosure, for example, U.S. Pat. No. 3,969,614 discloses a method for controlling an internal combustion engine in which a digital computer is used to control the controlled variables of the engine, including the amount of fuel supplied to the engine, the ignition timing and the amount of exhaust gases recirculated through the engine, on the basis of the results of detection on the amount of intake air supplied to the engine, the temperature of the engine, the rotating speed of the engine, the load of the engine, and the composition of exhaust gases from the engine.

In the steady running condition of a motor vehicle driven by an internal combustion engine, the amount of intake air supplied to the engine is the most important factor for controlling the amount of fuel supplied to the combustion chamber of the engine. The flow rate of intake air is detected by an air flow meter disposed upstream of the throttle valve, and an output signal representing the detected flow rate of intake air is delivered from the air flow meter.

In a fuel supply system in which fuel is supplied to an internal combustion engine in synchronous relation with the engine crankshaft position, a method is generally employed according to which the open period of the fuel valve is controlled to control the amount of fuel supplied to the engine. In this case, the open period of the fuel valve is controlled to lie approximately within the range of 2.5 ms to 9 ms. When a digital signal is used as this control signal for controlling the open period of the fuel valve, a binary-coded decimal signal of 12 bits ($=4\times3$) will be enough to ensure the accuracy of control within 1%. Suppose that the minimum open period 2.5 ms of the fuel valve corresponds to a binary-coded decimal number 100. Then, the maximum open period 9 ms of the fuel valve will be less than a binary-coded decimal number 400, and the number of bits of the binary-coded decimal signal will be as many as 11 bits ($=3+4+4$). Suppose further that the digital signal is a binary-coded signal, and 256 ($=2^8$) corresponds to the maximum open period 9 ms of the fuel valve. Then, the minimum open period 2.5 ms of the fuel valve will correspond to about 50, and a digital signal of 8 bits will be enough to ensure the accuracy of control within $\pm1\%$ ($=\pm0.5/50$). Therefore, a digital control signal having a limited number of bits as above described can be sufficiently used for the desired control of the amount of fuel supplied to the engine.

However, due to the fact that the output signal of the air flow meter has a level which is generally approximately proportional to the detected flow rate of intake air, the output signal of the air flow meter has a low level when the flow rate of intake air is small. Thus, when the output signal of such a low level is converted into a digital signal of a limited number of bits to be used for digital processing, a change in the flow rate of intake air in this region cannot be represented with high accuracy. In other words, the resolution of the flow rate of intake air is degraded in the small flow rate region when such a flow rate is represented by the digital signal of the limited number of bits. This fact will be discussed in more detail. Generally, the metering range of the air flow meter metering the flow rate of intake air is from about 0.1 $m^3$/min to about 5 $m^3$/min which is about 50 times the value of 0.1 $m^3$/min. Suppose that the flow rate of intake air is represented by a binary-coded signal of 10 bits, and the maximum flow rate of intake air 5 $m^3$/min is represented by $2^{10}=1024$, then, the minimum flow rate of intake air which is about 0.1 $m^3$/min is represented by $1024/50\frac{7}{8}20\frac{7}{8}2^4=16$. Therefore, a high resolution of about $1/1000\times100=0.1\%$ is obtained in a region where the flow rate of intake air is large or close to its maximum, and a change in the flow rate of intake air can be indicated with high accuracy in such a region. However, the resolution is only about $1/20\times100=5\%$ in a region where the flow rate of intake air is small or close to its minimum, and a change in the flow rate of intake air within 5% cannot be indicated in such a region.

Therefore, in an engine control system in which the output signal of an air flow meter is converted into a digital signal of a limited number of bits and is then subjected to digital processing by a microprocessor to obtain a control signal for controlling the amount of fuel supplied to the combustion chamber of the engine, the control signal contains an insufficient amount of information when the flow rate of intake air is small, and the accuracy of control of the amount of fuel supplied to the combustion chamber of the engine is reduced in the region where the flow rate of intake air is small or close to its minimum. The control of the air-fuel ratio to maintain it at a proper value in the region of the small flow rate of intake air, that is, during driving a vehicle at low speeds is especially important from the viewpoint of obviating environmental pollution by the toxic components of engine exhaust gases, and such a reduction in the accuracy of control of the amount of fuel supplied to the combustion chamber of the engine must be avoided as much as possible. It is necessary to increase the number of bits of the digital signal representing the flow rate of intake air detected by the air flow meter in order to prevent the undesirable reduction in the accuracy of control in the region of the small flow rate of intake air. To this end, the microprocessor must have a parallel processing capacity with an increased number of bits, or the arithmetic processing time in the microprocessor must be extended when the parallel processing capacity of the microprocessor is not increased. The former is disadvantageous from the economical standpoint, and the latter is also disadvantageous from the standpoint of the control response, hence, the accuracy of control.

The prior art proposals have failed to refer to the problem of the forementioned reduction in the accuracy of control of the internal combustion engine in the region of the small flow rate of intake air, especially, the problem of the undesirable reduction in the accuracy of control of the amount of fuel supplied to the combustion chamber of the engine in such a region, and have also failed to provide any concrete solution for this problem.

SUMMARY OF THE INVENTION

It is a primary object of the present invention to provide a control system of the kind including a microprocessor for controlling an internal combustion engine, especially, for controlling the amount of fuel supplied to the combustion chamber of the engine on the basis of a principal control factor which is the flow rate of intake air, which system is novel and improved over the prior art systems in that no increase is required in the parallel processing capacity of the microprocessor, and the arithmetic processing time need not be unnecessarily extended.

It is an important feature of the engine control system according to the present invention that the air flow meter provides an output signal having such a non-linear characteristic relative to the flow rate of intake air that the signal level increases in the region of the small flow rate of intake air, and on the basis of such an output signal, the microprocessor carries out necessary digital processing to provide a control signal used for the control of the internal combustion engine, especially, for the control of the amount of fuel supplied to the combustion chamber of the engine.

DESCRIPTION OF THE PREFERRED EMBODIMENTS

Figure 1:
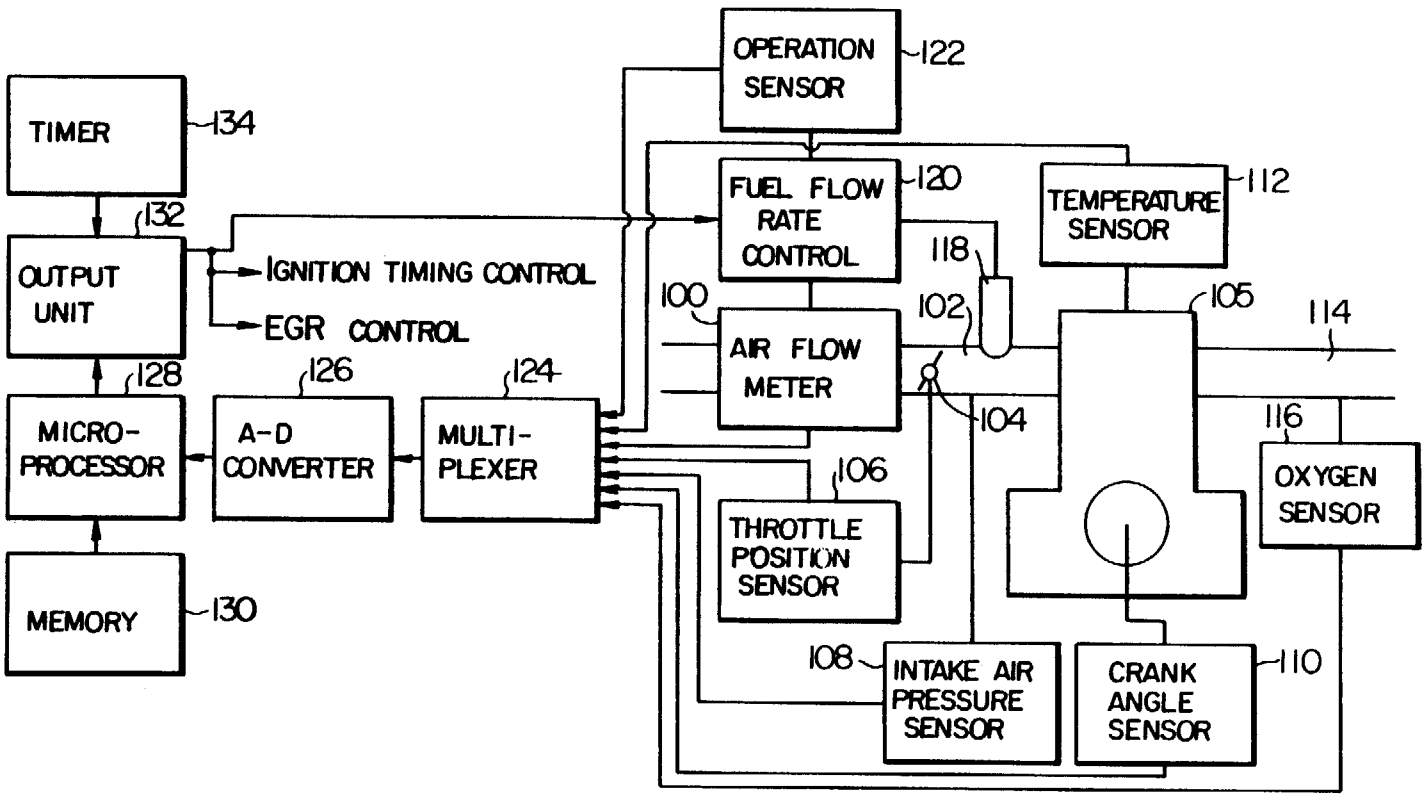
FIG. 1 is a schematic block diagram of an embodiment of the control system for an internal combustion engine according to the present invention.

The present invention will now be described in detail with reference to the accompanying drawings. Referring to FIG. 1, an air flow meter 100 is disposed upstream of a throttle valve 104 in an intake duct 102 of an internal combustion engine 105. The air flow meter 100 generates an output signal representing the flow rate of air supplied into the intake manifold of the engine 105 depending on the opening of the throttle valve 104. This output signal of the air flow meter 100 is a most important factor for the control of the amount of fuel to be supplied to the combustion chamber of the engine 105. The amount of supplied fuel should be varied depending on the operating condition of the engine 105, and means are provided for this purpose which include a throttle position sensor 106 detecting the opening of the throttle valve 104, an intake air pressure sensor 108 detecting the air pressure in the intake manifold, a crank angle sensor 110 detecting the angular position of rotation of the engine crankshaft, a temperature sensor 112 detecting the temperature of the engine cylinder head and/or the temperature of the engine crankshaft, and an oxygen sensor 116 detecting the exhaust gas composition in an exhaust manifold 114, especially, the concentration of oxygen contained in the engine exhaust gases. A fuel flow rate control unit 120 is provided for controlling the flow rate of fuel injected into the intake manifold from a fuel injection unit 118. A sensor 122 sensing the operation of the fuel flow rate control unit 120 is provided to correct the amount of fuel injected from the fuel injection unit 118 when the control unit 120 is incorrectly active. The output signals of the air flow meter 100 and sensors 106, 108, 110, 112, 116 and 122 are applied to a microprocessor 128 through a multiplexer 124 and an analog-to-digital (A-D) converter 126. In response to the application of these digital input signals, the microprocessor 128 carries out necessary digital processing of these inputs using various constants and functions previously stored in an associated memory unit 130 and delivers through an output unit 132 various control signals required for the control of the operation of the engine, such as the control of the amount of supplied fuel, control of the ignition timing and control of the exhaust gas recirculation. A timer 134 is provided so that such control signals can be applied to the various control units during the desired period of time.

In FIG. 1, the multiplexer 124 and A-D converter 126 are shown included in the system since it is supposed that the air flow meter 100 and various sensors 106, 108, 110, 112, 116 and 122 generate analog output signals.

When, however, the air flow meter and sensors are designed to generate digital output signals, the multiplexer 124 and A-D converter 126 may be replaced by an input unit used generally for a digital computer. The fuel injection unit 118 is shown injecting fuel to a point downstream of the throttle valve 104 in the intake duct 102, as it is associated with the so-called continuous metering type adapted for supplying fuel without regard to the rotation phase of the engine. However, in case of the so-called intermittent metering type adapted for supplying fuel in synchronous relation with the rotation phase of the engine, the fuel injection unit 118 is disposed as shown, or otherwise on the cylinder head of the engine. It is apparent that various other sensors than those shown in FIG. 1 may be provided as required. The multiplexer 124, A-D converter 126, microprocessor 128, memory unit 130 and output unit 132 may be disposed on a single substrate or printed circuit board.

Figure 2:
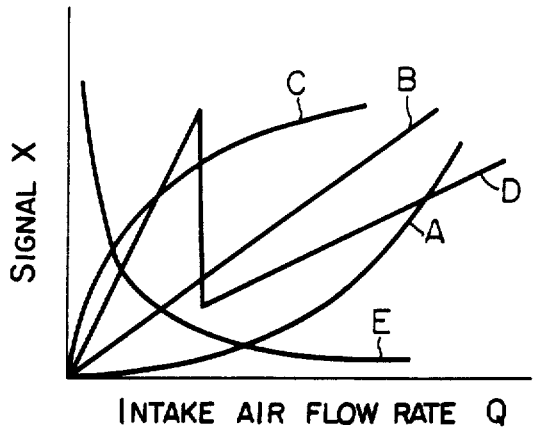
FIG. 2 is a graph showing various output signals of the air flow meter in FIG. 1 relative to the flow rate of intake air.

FIG. 2 shows the level of the output signal X of the air flow meter 100 relative to the flow rate Q of intake air. The output signal X appearing from the air flow meter in the prior art is as shown by the curve A or B in FIG. 2, and it will be seen that the output signal X has a level approximately linearly proportional to the metered flow rate Q of intake air, and the resolution for the flow rate Q of intake air is reduced in the region of the small flow rate of intake air when this signal X is converted into a digital signal of a limited number of bits to be subjected to digital processing in the microprocessor 128. This problem can be solved when the level of the signal X relative to the flow rate Q of intake air in the region of the small flow rate of intake air is increased as shown by the curve C, D or E in FIG. 2. In the case of the curve E, the signal X has a low level in the region of the large flow rate of intake air, and the resolution for the metered flow rate of intake air is reduced in such a region, resulting in a corresponding reduction in the accuracy of control of the amount of fuel supplied to the combustion chamber of the engine. However, in the region in which the flow rate of intake air is large, that is, when the vehicle is running at high speeds, the air-fuel ratio need not be so strictly determined as the engine exhaust gases do not contain toxic components in such a large amount which will give rise to the problem of environmental pollution.

Suppose that the relation between the flow rate Q of intake air and the output signal X of the air flow meter 100 is expressed as $$X=\phi(Q) \tag{1}$$

Differentiation of the equation (1) gives the following equation:

$$\Delta X=\partial\phi/\partial Q\cdot\Delta Q \tag{2}$$

Suppose then that $\Delta Q/Q$ and $\Delta X$ are constant, then, the following equation holds:

$$\partial\phi/\partial Q=K/Q \tag{3}$$

where K is a constant.

Figure 3:
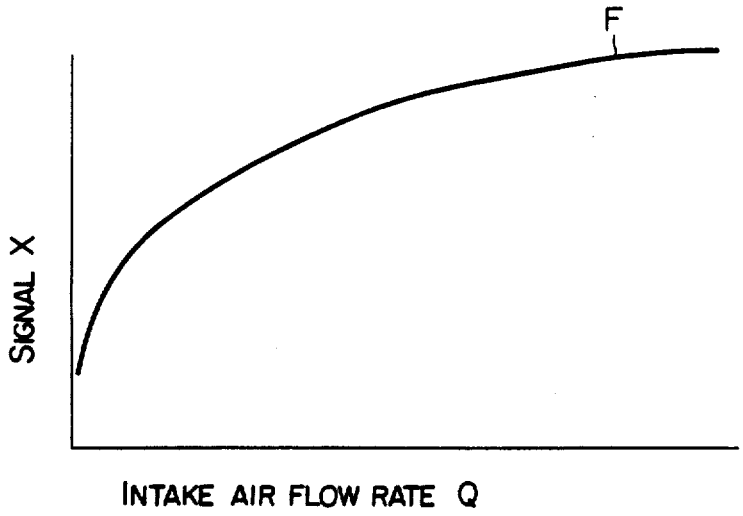
FIG. 3 is a graph showing a most ideal output signal of the air flow meter relative to the flow rate of intake air.

X is expressed as $$X=\phi=K_1\log Q+K_2 \tag{4}$$

where $K_1$ and $K_2$ are constants. It is thus known that, when the signal X represented by the equation (4) is obtained for the flow rate Q of intake air, $\Delta X$ is constant when the $\Delta Q/Q$ is constant, that is, the level of the signal X changes always at a constant rate when the flow rate Q of intake air changes at a constant rate. This proves the fact that the same resolution is obtained over the entire range of the flow rate Q of intake air which is converted into a digital signal. The relation between the flow rate Q of intake air and the output signal X of the air flow meter 100, which relation is expressed by the equation (4), corresponds to the curve C in FIG. 2 and is shown by the curve F in FIG. 3. Suppose that 1 $m^3$ of air has a weight of 1.5 Kg, then, the aforementioned flow rate of 0.1 to 5 $m^3$/min is converted approximately into 9 to 450 Kg/h. Suppose then that $K_1=1$ and $K_2=0$ in the equation (4), then, the value of the signal X ranges from 2.2 (=log 9) to 8.3 (=log 450). Thus, the output signal X of the air flow meter 100 can be converted into a digital signal of a small number of bits since the maximum value 8.3 is only about 4 times as large as the minimum value 2.2. The equation (4) representing the relation between the flow rate Q of intake air and the output signal X of the air flow meter 100 provides an ideal relation. For the purpose of the present invention, the relation between the flow rate Q of intake air and the output signal X of the air flow meter 100 is not limited to that represented by the equation (4) and may be as that represented by the curve D or E in FIG. 2.

Figure 4:
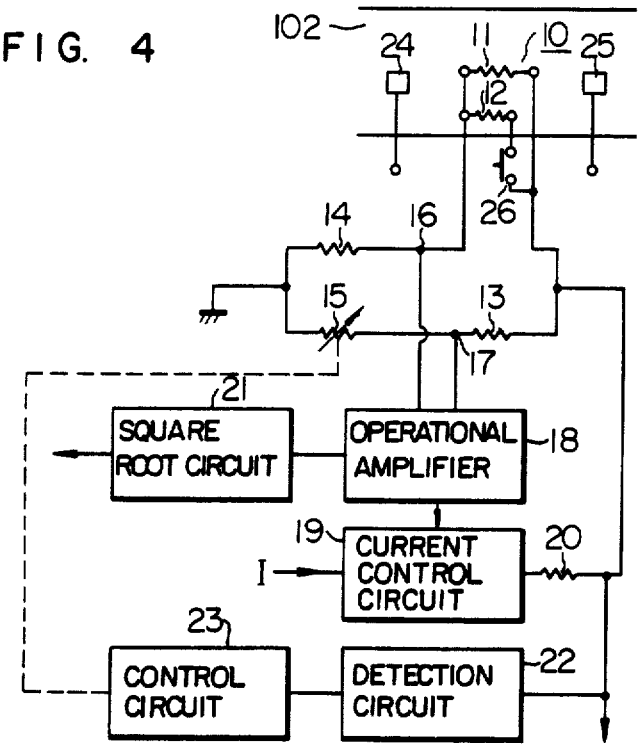
FIG. 4 shows schematically the structure of one form of the air flow meter preferably employed in the present invention.

FIG. 4 shows schematically the structure of one form of the air flow meter 100 preferably employed in the present invention. The air flow meter shown in FIG. 4 is of the thermal type having a heater 10 including fixed resistors 11 and 12. This heater 10 constitutes a resistance bridge circuit together with fixed resistors 13, 14 and a variable resistor 15. A change in the flow rate of intake air results in a corresponding change in the temperature of the heater 10, and a voltage corresponding to the change in the heater temperature appears across the bridge terminals 16 and 17. This voltage is applied to an operational amplifier 18 to be integrated, and the resultant control signal is applied from the operational amplifier 18 to a current control circuit 19. In response to the application of the control signal to the current control circuit 19, it acts to increase the current value supplied to the heater 10 to compensate the temperature drop in the heater 10, while it acts to decrease the current value supplied to the heater 10 to compensate the temperature rise in the heater 10, so that the bridge circuit can be balanced always. This change in the current value is derived as a change in the voltage across a resistor 20, and the output signal X thus obtained for the metered flow rate Q of intake air is applied to the microprocessor 128.

Figure 5:
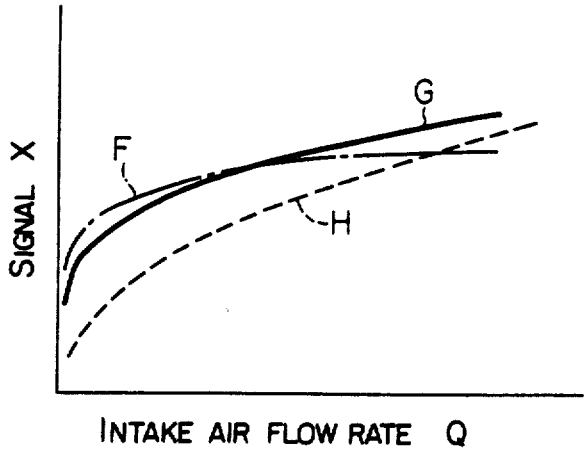
FIG. 5 is a graph illustrating the output signal of the air flow meter shown in FIG. 4.

From the balance between the quantity of heat generated by the heater 10 and the degree of cooling of the heater 10 depending on the flow rate Q of intake air, the following equation holds:

$$RI^2=(A+B\sqrt{Q})(T_w-T_a) \tag{5}$$

where I is the current value supplied to the heater 10 to maintain constant the temperature of the heater 10, R is the resistance value of the resistor 11 in the heater 10, A and B are constants determined from the theory of thermal conduction, $T_w$ is the temperature of the heater 10, and $T_a$ is the temperature of intake air. It will be apparent from the equation (5) that the current I, hence, the output signal X of the flow meter is a function of the biquadratic root of the flow rate Q of intake air and is approximate to the curve F shown in FIG. 3. In FIG. 5, such a curve F is shown by the one-dot chain line, and the curve G shown by the solid line corresponds to the relation given by the equation (5).

Another method may be used to obtain a curve approximate to the curve F. According to this method, the bridge circuit is balanced when the flow rate Q of intake air is zero, and with the increase in the flow rate Q of intake air, the current I supplied to the heater 10 is increased in a relation corresponding to the voltage appearing across the bridge terminals 16 and 17. This voltage is proportional to the square root of the flow rate Q of intake air. Thus, when this voltage is applied to a square-root circuit 21 after being integrated in the operational amplifier 18, and the output of the square-root circuit 21 is derived as the signal X, this signal X is a function of the biquadratic root of the flow rate Q of intake air and can be approximated to the curve F. The dotted curve H in FIG. 5 represents the output of the operational amplifier 18 in this case.

The air flow meter shown in FIG. 4 further includes a detection circuit 22 which detects the value of the signal X and generates its output signal when a predetermined value is detected, and a control circuit 23 including an element such as a servomotor which operates to adjust the resistance value of the variable resistor 15 in response to the application of the output signal of the detection circuit 22 thereto, so that the curve G can be further approximated to the curve F in the region in which the flow rate Q of intake air is small. The control circuit 23 adjusts the resistance value of the variable resistor 15 so as to increase the heater temperature $T_w$ in the region in which the flow rate Q of intake air is small. The reference numerals 24 and 25 designate temperature sensors detecting the intake air temperatures at points upstream and downstream respectively of the heater 10 in the intake duct 102, and the numeral 26 designates a switch used for varying the resistance value of the heater 10.

Figure 6:
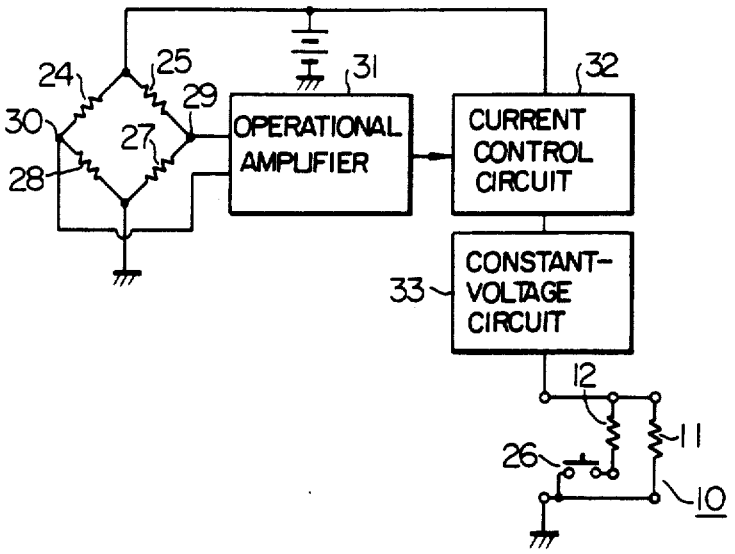
FIG. 6 shows schematically the structure of another form of the air flow meter preferably employed in the present invention.

FIG. 6 shows schematically the structure of another form of the air flow meter 100 preferably employed in the present invention. The air flow meter shown in FIG. 6 is of the thermal type similar to that shown in FIG. 4. Referring to FIG. 6, temperature sensitive resistances are used as intake air temperature sensors 24 and 25 which constitute a bridge circuit together with fixed resistors 27 and 28. The bridge voltage appearing across the bridge terminals 29 and 30 is applied to an operational amplifier 31 to be integrated to provide a control signal applied to a current control circuit 32. When the current control circuit 32 controls the current supplied to a heater 10 composed of resistors 11 and 12 so as to provide zero bridge voltage across the bridge terminals 29 and 30, the following reation holds:

$$C_p \cdot Q \cdot \Delta T = RI^2 \qquad (6)$$

where $C_p$ is the specific heat at constant pressure, and $\Delta T$ is the difference between the intake air temperatures detected by the temperature sensors 24 and 25. The temperature difference $\Delta T$ is constant when the bridge voltage appearing across the bridge terminals 29 and 30 is zero. Therefore, the flow rate Q of intake air is found by measuring the power consumption $RI^2$ of the heater 10. A constant-voltage circuit 33 is connected between the current control circuit 32 and the heater 10 to apply a constant voltage across the heater 10. Thus, the heater current I is proportional to the flow rate Q of intake air. Therefore, detection of the heater current I provides the signal X representing the flow rate Q of intake air, as in the case of the air flow meter structure shown in FIG. 4. In the region in which the flow rate of intake air is small, the resistor 11 in the heater 10 is used alone by disconnecting the resistor 12 by turning off a switch 26. On the other hand, in the region in which the flow rate of intake air is large, the switch 26 is turned on to connect the resistor 12 in parallel with the resistor 11 thereby decreasing the resistance value of the heater 10. In this manner, a non-linear characteristic similar to that shown by the curve D in FIG. 2 can be obtained.

In the air flow meter structure shown in FIG. 6, the bridge voltage is proportional to the temperature difference $\Delta T$, hence, inversely proportional to the flow rate Q of intake air when the heater current I is maintained constant. In such a case, therefore, the signal X obtained by integrating the bridge voltage in the operational amplifier 31 has a non-linear characteristic as shown by the curve E in FIG. 2.

Figure 7:
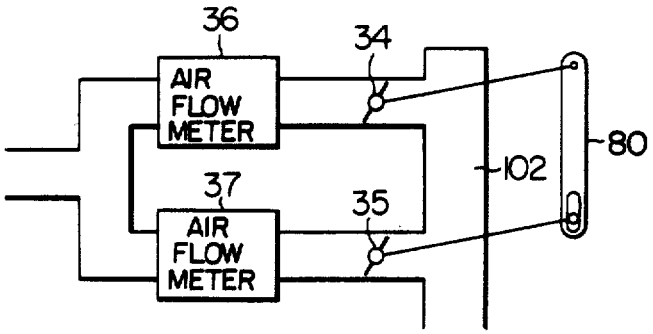
FIG. 7 shows schematically the structure of still another form of the air flow meter preferably employed in the present invention.
Figure 8:
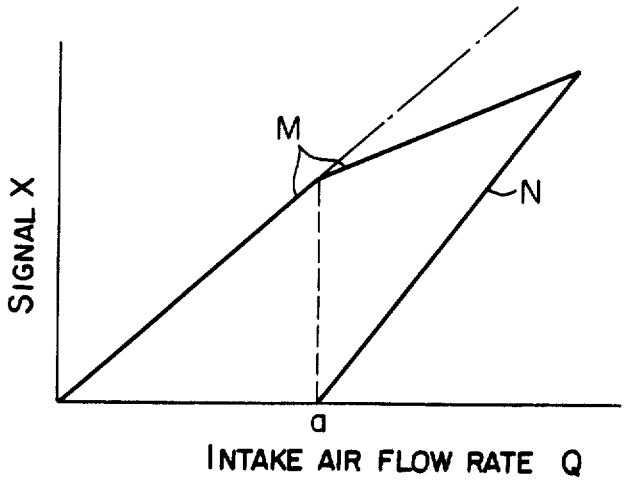
FIG. 8 is a graph illustrating the output signal of the air flow meter shown in FIG. 7.

FIG. 7 shows schematically the structure of still another form of the air flow meter 100 preferably employed in the present invention. The air flow meter shown in FIG. 7 is of the so-called multi-stage type, and two throttle valves 34 and 35 are disposed in the intake duct 102. The throttle valve 34 is first rotated through a linkage 80, and after the throttle valve 34 has been rotated to a selected angular position, the throttle valve 35 is then rotated through the linkage 80. Air flow meter units 36 and 37 are disposed upstream of the throttle valves 34 and 35 respectively and may be conventionally known ones each having a linear characteristic as shown by the curve B in FIG. 2. In the region in which the flow rate of intake air is small, the throttle valve 34 is rotated while the throttle valve 35 is held from rotation, so that the flow rate Q of intake air is detected by the air flow meter unit 36, and its output signal X is proportional to the flow rate Q of intake air. Subsequently, the throttle valve 35 is rotated, and the stream of intake air is divided into two portions passing through the throttle valves 34 and 35, so that the output signal X of the air flow meter unit 36 is reduced to a level lower than that proportional to the flow rate Q of intake air. FIG. 8 shows the characteristic of the air flow meter shown in FIG. 7, and the rotation of the throttle valve 35 starts at a point a. The curve M in FIG. 8 represents the characteristic of the air flow meter unit 36, and the line N represents that of the air flow meter unit 37. By suitably determining the proportional constants of the linear characteristics of the air flow meter units 36 and 37, the curve M in FIG. 8 can be substantially approximated to the curve C shown in FIG. 2.

Figure 9:
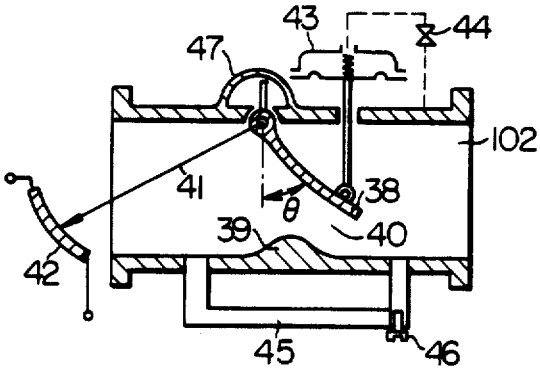
FIG. 9 shows schematically the structure of yet another form of the air flow meter preferably employed in the present invention.

FIG. 9 shows the structure of yet another form of the air flow meter 100 preferably employed in the present invention. The air flow meter shown in FIG. 9 is of the so-called area type. Referring to FIG. 9, a vane 38 rotates through an angle $\theta$ corresponding to the flow rate Q of intake air to define a restricted opening 40 between it and a ridge portion 39. A pointer 41 is fixed to the vane 38 for making swinging movement with the rotation of the vane 38, and thus, the movement or displacement of the pointer 41 is proportional to the rotating angle $\theta$ of the vane 38. A potentiometer 42 is associated with the pointer 41 to convert the displacement of the pointer 41 into a corresponding voltage, so that the output voltage of the potentiometer 42 provides the signal X. A vacuum actuated servo 43 is operatively connected with the vane 38, and the setting of the servo 43 is controlled by a control valve 44 so as to adjust the sensitivity of the air flow meter. A bypass 45 is provided to bypass a portion of intake air as required, and a bypass adjusting screw 46 is provided to adjust the amount of air bypassing through the bypass 45. A damper 47 is provided to prevent pulsating movement of the vane 38 due to pulsation of intake air supplied into the intake manifold of the engine.

Figure 10:
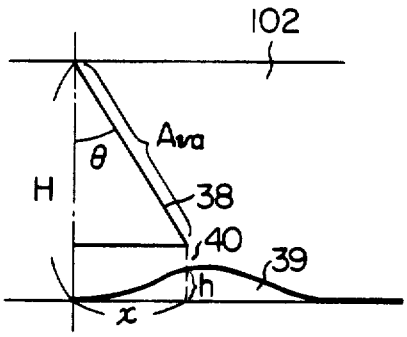
FIG. 10 illustrates how an ideal output signal can be provided by the air flow meter shown in FIG. 9.

FIG. 10 illustrates how the level of the output signal X of the air flow meter shown in FIG. 9 can be increased in the region of the small flow rate of intake air. Suppose that the area $A_{op}$ of the restricted opening 40 is expressed as $A_{op}=C_A \cdot e\theta$($C_A$: constant). Then, the angle $\theta$, hence, the output signal X is a function of the logarithm of the area $A_{op}$ of the restricted opening 40, hence, the flow rate Q of intake air, and the ideal characteristic C described with reference to FIG. 2 can be obtained. The area $A_{op}$ of the restricted opening 40 can be expressed as $$A_{op}=A_{va} \cdot H\{1-\cos\theta-h\} \tag{7}$$

where $A_{va}$ is the area of the vane 38, H is the height of the vertical section of the intake duct 102 (the length of the vane 38 between its pivoted point and its free end being equal to the height of the vertical section of the intake duct 102 and given by H), x is the horizontal distance of the vane 38 between the pivoted point and the free end along the longitudinal axis of the intake duct 102 when the rotating angle of the vane 38 is $\theta$, and h is the height of the ridge portion 39 at the point of the distance x. From the equation (7), the height h of the ridge portion 39 is given by $$k = 1 - \cos\theta - \frac{A_{op}}{A_{vc} \cdot H} = 1 - \cos\theta - \frac{C_A \cdot e\theta}{A_{vc} \cdot H} \tag{8}$$

since $A_{op}$ is supposed to be $A_{op}=C_A \cdot e\theta$ *as above described. Due to the fact that* $x=H \sin\theta$, the height h of the ridge portion 39 is expressed as a function of x as follows:

$$h = 1 - \frac{C_A \cdot e\theta}{A_{va} \cdot H} - \sqrt{1 - \frac{x^2}{H^2}} \tag{9}$$

Thus, when the shape of the ridge portion 39 is determined to satisfy the relation given by the equation (9), the aforementioned relation $A_{op}=C_A \cdot e\theta$ can be obtained, and therefore, the ideal relation between the flow rate Q of intake air and the output signal X of the air flow meter can be obtained.

In the manner above described, the level of the signal X representing the flow rate Q of intake air can be increased in the region of the small flow rate of intake air without increasing the signal level in the region of the large flow rate of intake air. Such a characteristic of the signal X relative to the flow rate Q of intake air will be referred to as a non-linear characteristic in this specification. The non-linear characteristic referred to herein is limited to the above meaning and does not include the non-linearity such as that of the curve B in FIG. 2. It is apparent from the previous description on the ideal non-linear characteristic that the resolution for the flow rate Q of intake air in the region of the small flow rate of intake air can be improved without increasing the capacity of parallel processing of information bits by the microprocessor, when the signal X having such a so-called non-linear characteristic is generated by the air flow meter and converted into a digital signal to be subjected to digital processing in the microprocessor. The information of the flow rate Q of intake air obtained as a result of arithmetic processing of the signal X having the non-linear characteristic in the microprocessor does not naturally exactly correspond to the practical flow rate Q of intake air. Thus, the proper air-fuel ratio cannot be obtained when the amount of fuel supplied to the combustion chamber of the engine is directly controlled on the basis of such information. It is therefore necessary to suitably convert the air flow rate information for the accurate control of the amount of supplied fuel in order that the specific information output of the microprocessor can exactly correspond to the detected flow rate Q of intake air.

Figure 11:
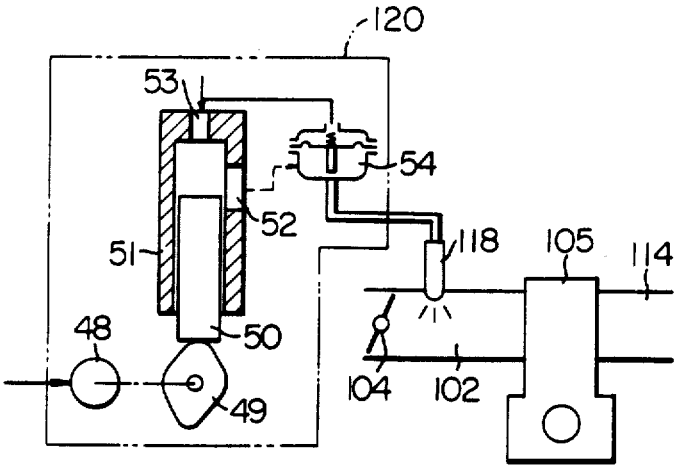
FIG. 11 is a diagrammatic view of one form of the fuel flow rate control unit of continuous metering type preferably employed in the present invention.

FIG. 11 shows schematically the structure of one form of the fuel flow rate control unit 120 in the continuous metering type system preferably employed in the present invention. Referring to FIG. 11, a motor 48 operates according to the air flow rate information signal applied from the microprocessor 128 to drive a cam member 49. The rotation of the cam member 49 causes corresponding sliding movement of a metering piston 50 within a cylinder 51 thereby changing the open area of a metering slit 52 provided in the side wall of the cylinder 51. Fuel is supplied into the cylinder 51 through a fuel supply port 53. A differential pressure control valve 54 acts to maintain constant the fuel pressure differential across the metering slit 52 so that the flow rate of fuel flowing through the metering slit 52 is proportional to the open area of the metering slit 52. The fuel in an amount proportional to the open area of the metering slit 52 is fed through the differential pressure control valve 54 to the fuel injection unit 118, thence into the intake duct 102. The motor 48 may be a servomotor when the air flow rate information output signal of the microprocessor 128 is the digital signal to be subjected to D-A conversion. The motor 48 may be a pulse motor when the air flow rate information output signal of the microprocessor 128 is applied in the form of the digital signal which does not require the D-A conversion.

The air flow rate information output signal of the microprocessor 128 is converted in the fuel flow rate control unit 120 shown in FIG. 11 in a manner as described with reference to FIGS. 12 and 13. It is supposed herein that the output signal X of the air flow meter is given by the equation (4).

Figure 12:
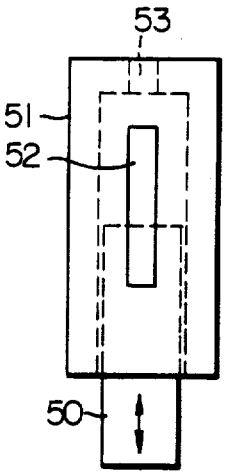
FIGS. 12 and 13 illustrate how a proper amount of fuel can be supplied by the fuel flow rate control unit shown in FIG. 11.

Referring to FIG. 12, the open area As of the metering slit 52 is increased or decreased in proportional relation to the retracting or advancing stroke Sp of the piston 50, and the flow rate of fuel flowing through the metering slit 52 is also proportional to the stroke Sp of the piston 50. Therefore, the flow rate of fuel is proportional to the flow rate of intake air when the piston 50 urged in either direction according to the air flow rate information output signal of the microprocessor 128 is displaced in such a relation that its stroke Sp is proportional to the detected flow rate Q of intake air. Thus, for the signal X given by the equation (4), the piston 50 makes its stroke Sp in proportional relation to the detected flow rate Q of intake air when the piston stroke Sp is selected to satisfy the following equation:

$$\text{ti } X=K_1' \log S_p+K_2' \tag{10}$$

where $K_1'$ and $K_2'$ are constants. The stroke $S_p$ of the piston 50 satisfying the equation (10) is obtained by suitably selecting the profile of the cam member 49.

Figure 13:
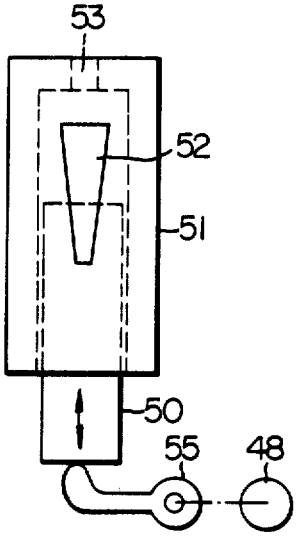

Referring to FIG. 13, the piston 50 is adapted to be urged by a lever 55 driven by the motor 48, instead of being urged by the cam member 49, so that the piston 50 makes its stroke $S_p$ in proportional relation to the air flow rate information provided by the output signal of the microprocessor 128. In such a case, the information can be converted in a manner as described below by similarly suitably selecting the shape of the metering slit 52. The stroke $S_p$ of the piston 50 is expressed, in this case, as $$S_p = K_1'' \log Q + K_2'' \quad (11)$$

where $K_1''$ and $K_2''$ are constants. Therefore, the open area As of the metering slit 52, hence, the flow rate of fuel through the metering slit 52 can be made proportional to the detected flow rate Q of intake air when the shape of the metering slit 52 is determined to satisfy the following relation:

$$S_p = K_1''' \log As + K_2''' \quad (12)$$

where $K_1'''$ and $K_2'''$ are constants. The information output signal of the microprocessor 128 may be converted into an analog signal by a non-linear D-A converter to attain the desired D-A conversion of the information.

Figure 14:
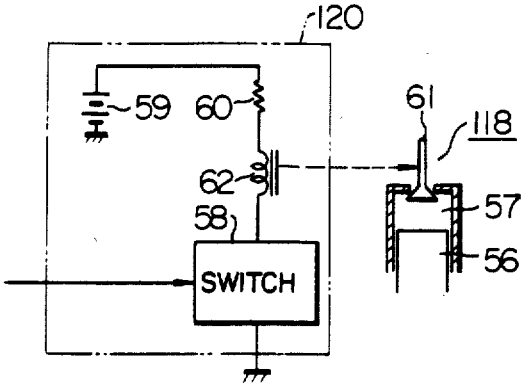
FIG. 14 is a diagrammatic view of one form of the fuel flow rate control unit of intermittent metering type preferably employed in the present invention.

FIG. 14 shows schematically the structure of one form of the fuel flow rate control unit 120 used in the so-called intermittent metering type system, preferably employed in the present invention. In the so-called intermittent metering type system, fuel is supplied into the combustion chamber 57 of the cylinder in synchronous relation with the rotation phase of the engine. Referring to FIG. 14, a switch circuit 58 which may be a transistor circuit of Darlington connection is turned on during a limited period of time corresponding to the high level of the information output signal of the microprocessor 128. In response to the turn-on of the switch circuit 58, current is supplied from a power source 59 to the electromagnetic coil 62 of the fuel value 61 through a resistor 60. The fuel valve 61 is held open during the period of time of energization of the coil 62 thereby supplying fuel into the combustion chamber 57. (Actually, the mixture of atomized fuel and air is supplied into the combustion chamber 57.) Therefore, the amount of fuel supplied to the combustion chamber 57 is proportional to the period of time $\Delta t_p$ during which the fuel valve 61 is held in its open position.

This open period of time $\Delta t_p$ of the fuel valve 61 is determined to be proportional to the detected flow rate Q of intake air and inversely proportional to the rotating speed n of the engine. Therefore, when the rotating period of the engine $T_a$, the following relation holds:

$$\Delta t_p \propto Q \cdot T_a \quad (13)$$

hence, $$\log \Delta t_p \propto \log Q + \log T_a \quad (14)$$

Introducing the equation (4) into the equation (14), log $\Delta t_p$ is expressed as follows:

$$K_3 \log \Delta t_p = X + \log T_a + K_4 \quad (15)$$

where $K_3$ and $K_4$ are constants. The equation (15) indicates the fact that the open period of time $\Delta t_p$ of the fuel valve 61 can be computed on the basis of X given by the equation (4). Therefore, in lieu of converting the air flow rate information provided by the output signal of the microprocessor 128, the valve open time $\Delta t_p$ may be computed in the microprocessor 128 according to the equation (15), and the resultant output signal of the microprocessor 128 may be used directly for turning on the switch circuit 58 so as to supply the proper amount of fuel to the combustion chamber 57.

Figure 15:
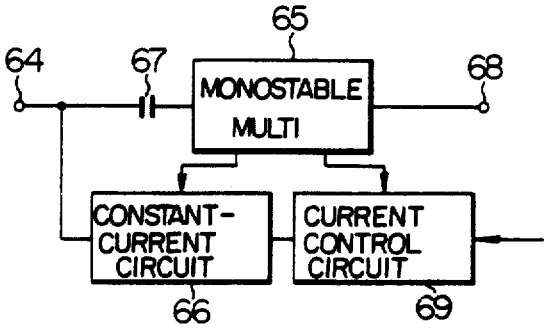
FIG. 15 is a schematic block diagram of part of another form of the fuel flow rate control unit of intermittent metering type preferably employed in the present invention.
Figure 16:
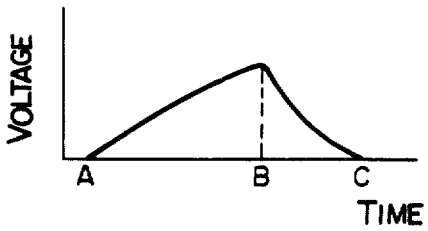
FIG. 16 illustrates the operation of the control unit shown in FIG. 15.

FIG. 15 is a schematic block diagram of part of another form of the fuel flow rate control unit 120 of the intermittent metering type preferably employed in the present invention. In the modification shown in FIG. 15, the signal proportional to $Q \cdot T_a$ in the expression (13) is derived from a unique circuit in lieu of carrying out the computation of the equation (15) in the microprocessor 128. Referring to FIG. 15, a pulse of a signal synchronous with the rotation phase of the engine is applied to an input terminal 64 at time A in FIG. 16. A monostable multivibrator 65 is triggered to actuate a constant-current circuit 66, and a constant current charges a capacitor 67. In response to the application of the next pulse of the synchronous signal to the input terminal 64 at time B in FIG. 16, the monostable multivibrator 65 actuates a current control circuit 69, and the capacitor 67 starts to discharge. Therefore, the voltage value at time B in FIG. 16 is proportional to the rotating period $T_a$ of the engine. The discharge current $I_d$ of the capacitor 67 has a constant value which is inversely proportional to the information of the detected flow rate Q of intake air provided by the information signal applied to the current control circuit 69 from the microprocessor 128. Therefore, the relation $$t_d \propto Q \cdot T_a \quad (16)$$

holds since the discharge period of time $t_d$ between time B and time C in FIG. 16 is proportional to $T_a/I_d$, and $I_d$ is inversely proportional to Q. The signal representing $t_d$ is applied from an output terminal 68 to the switch circuit 58 shown in FIG. 14 to turn on the same.

Figure 17:
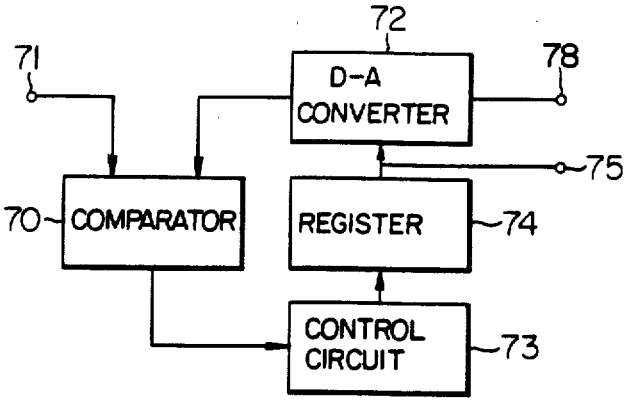
FIG. 17 is a schematic block diagram of part of still another form of the fuel flow rate control unit of intermittent metering type preferably employed in the present invention.

FIG. 17 is a schematic block diagram of part of still another form of the fuel flow rate control unit 120 of the intermittent metering type preferably employed in the present invention. In the modification shown in FIG. 17, the signal representing the open period of time $\Delta t_p$ of the fuel valve 61 is obtained when the signal X having a non-linear characteristic inversely proportional to the flow rate Q of intake air, such as that represented by the curve E in FIG. 2, is applied to the microprocessor 128. From the equation (13), the valve open time $\Delta t_p$ is expressed as $$\Delta t_p = K_y/(n \cdot Y) \quad (17)$$

where $Y = K_y/Q$. The value of $(n \cdot Y)$ lies approximately within the range of 0.4 to 0.1 since the valve open time $\Delta t_p$ is about 2.5 ms to 9 ms as described hereinbefore. The microprocessor 128 computes $(n \cdot Y)$ and applies its output signal representing the result of computation to a multipliable D-A converter 72 through an input terminal 78. The signal representing Ky is applied to a comparator 70 through another input terminal 71 to be compared with the output signal of the D-A converter 72. The comparator 70 continues to generate its output signal until coincidence is reached between these two input signals. A control circuit 73 operates in response to the output signal of the comparator 70 to alter the content of a register 74. When Ky/(n·Y) is finally registered in the register 74, an output signal representing $(Ky/n \cdot Y) \times (n \cdot Y) = Ky$ appears from the multipliable D-A converter 72. The comparator 70 ceases to generate its output signal, and the content of the register 74 is fixed at Ky/(n·Y). The signal representing this Ky/(n·Y) appears at an output terminal 75 to be applied to the switch circuit 58 shown in FIG. 14.

It is necessary to change the amount of fuel supplied to the combustion chamber of the engine in order to provide the proper air-fuel ratio corresponding to the operating condition of the engine. For this purpose, the output signal X of the air flow meter must be corrected depending on the factors including the temperature, rotating speed and load of the engine and the composition of exhaust gases. The amount ΔX required for correcting the output signal X of the air flow meter for the purpose of providing the proper air-fuel ratio is given by the following equation:

$$Q/q = e^{\Delta X} \tag{18}$$

where q is the amount of fuel supplied to the combustion of fuel supplied to the combustion chamber of the engine. Therefore, the air-fuel ratio of the air-fuel mixture supplied to the combustion chamber of the engine can be controlled by sensing the engine temperature, engine rotating speed, engine load and exhaust gas composition by the various sensors 106 to 116 shown in FIG. 1, applying these sensor output signals to the microprocessor 128 and computing ΔX using the functions and constants stored previously in the memory unit 130. That is, the signal representing $\Delta X = \log Q/q$ is added to the output signal X of the air flow meter 100 to obtain the signal used for controlling the amount q of supplied fuel. In this case, the air-fuel ratio can be controlled with high accuracy by a digital signal of a small number of bits since both the signals X and ΔX are the function of log Q.

In the case of correction of the output signal X of the air flow meter 100 on the basis of the result of detection of oxygen in the engine exhaust gases by the oxygen sensor 116 using the zirconia element, the value ΔX is negative and positive when the outpt signal of the oxygen sensor 16 is higher and lower than a predetermined level respectively. The value of ΔX is such that it will not cause hunting of the system. Although the oxygen sensor 116 using the zirconia element has a high sensitivity, and its output signal fluctuates incessantly, the output signal of the oxygen sensor 116 is integrated in the microprocessor 128 or in an integrating circuit for a suitable period of time so that the average value thereof can be compared with the aforementioned predetermined level. Further, the microprocessor 128 may generate, during its computation processing time, a servomotor control signal in synchronous relation with the crank angle or at a rate of a constant time interval faster than the response time of the servomotor 48. In such a case, the control signal is averaged so as to accurately control the movement of the piston 50. Further, the control signal controlling the servomotor 48 may be held as a digital quantity during the computation processing time of the microprocessor 128. Thus, the output signal X of the air flow meter can be corrected in synchronous relation with the crank angle or at constant time intervals.

For the correction of the output signal X of the air flow meter 100 on the basis of the result of detection of the engine temperature by the temperature sensor 112, the output signal θ of the temperature sensor 112 is applied to the microprocessor 128 which computes ΔX as a function of θ. This correction is carried out when the detected engine temperature lies in the low range.

For the correction of the output signal X of the air flow meter 100 on the basis of the results of detection of the rotating speed and load of the engine, the output signal of the crank angle sensor 110 detecting the rotating speed of the engine is applied to the microprocessor 128 together with the output signal of the throttle position sensor 106 and/or the intake air pressure sensor 108 detecting the load and acceleration or deceleration of the engine, and the microprocessor 128 computes the value of ΔX using the functions and constants stored previously in the memory unit 130. During deceleration, the supply of fuel can be shut off. Further, the timer 134 is operated as required during, for example, starting or accelerating stage of the engine so as to correct the output signal X of the air flow meter 100 during such a stage only.

Figure 18:
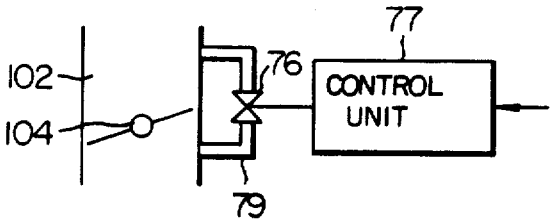
FIG. 18 is a schematic block diagram of a fast idling device.

When the temperature of the engine is low as in the starting stage of the engine, the engine is rotated in the idling mode while reducing the flow rate of intake air. In the idling mode of the engine, enough air-fuel mixture is not supplied to the combustion chamber resulting in irregular rotation of the engine. A fast idle device is provided for ensuring uniform rotation of the engine and increasing the rotating speed of the engine in the idling mode. As shown in FIG. 18, the fast idle device comprises a bypass 79, a bypass valve 76, and a control unit 77 controlling the opening of the bypass valve 76. The control unit 77 includes generally a heat responsive member such as a bimetal element or wax. The control unit 77 may be in the form of an electrical actuator such as an electromagnetic solenoid, a stepping motor, a PWM type electromagnetic member or a servomotor which is controlled by the output signal of the microprocessor 128. In this case, feedback control for the rotating speed of the engine can be attained by detecting the rotating speed of the engine by the crank angle sensor 110, comparing the detected value with the predetermined setting previously programmed in the memory unit 130, and actuating the control unit 77 on the basis of the result of comparison thereby controlling the flow rate of air flowing through the bypass 75. This feedback control is carried out when the output signal of the throttle position sensor 106 is detected to lie within the idling range of the engine. It is apparent that the output signal X of the air flow meter structure shown in FIGS. 4, 6, 7 or 9 has a non-linear characteristic relative to the flow rate Q of intake air supplied by the fast idle device. The control unit 77 may be arranged to directly control the throttle valve 104.

Figure 19:
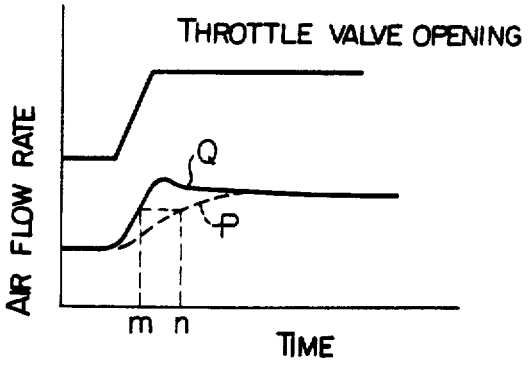
FIG. 19 is a graph showing the relation between the amount of intake air and the amount of air charged into the combustion chamber of the engine.

When the engine is operating steadily, the flow rate of air charged in the engine is approximately equal to the flow rate of intake air. However, these flow rates are not equal during the acceleration of the engine, and the flow rate Q of intake air is larger than the flow rate P of charged air with respect to time as shown in FIG. 19. Thus, the amount of supplied fuel should be determined on the basis of the flow rate P of charged air. Therefore, the amount of fuel supplied to be mixed with the charged air at time n in FIG. 19 must be controlled on the basis of the flow rate Q of intake air at time m. Considering the computation processing time of the microprocessor 128, the relation between the time m and the time n can be determined by suitably selecting the sequential order of signal transmission by the multiplexer 124 or selecting the processing program of the microprocessor 128.

The operation of the air flow meter 100 is affected by pulsation of intake air being supplied to the engine. It is therefore necessary to provide the damper 47 shown in FIG. 9 or to suitably determine the factors such as the volume, elasticity and length of the air intake duct 102 so as to eliminate the adverse effect due to pulsation of intake air. Further, the output signal X of the air flow meter 100 may be applied to the microprocessor 128 after being averaged for a suitable period of time or may be integrated to be averaged after being applied to the microprocessor 128 so as to eliminate the adverse effect due to pulsation of intake air. Such an adverse effect can be also obviated by sampling the output signal X of the air flow meter 100 at only a predetermined crank position.

We claim:

1. A control system for an internal combustion engine comprising: an air flow meter for metering the flow rate of intake air supplied to the engine and for producing an output signal relative to the flow rate of intake air; a plurality of sensors for detecting different conditions of engine operation; a microprocessor for carrying out digital computation on the basis of the output signal of said air flow meter and the output signals of said sensors thereby providing a plurality of control signals for controlling the controlled variables of the engine; fuel supply means for supplying fuel to the engine; and fuel flow rate control means for controlling the flow rate of fuel supplied by said fuel supply means according to a fuel flow rate control signal among the control signals; wherein said air flow meter includes means for producing, as said output signal relative to the flow rate of intake air, a non-linear signal having a *continually-increasing* non-linear characteristic *with increase in flow rate* such that the changing rate of said signal with respect to the flow rate of intake air is greater in a predetermined region in which the flow rate of intake air is small than in other regions of the flow rate of intake air, said microprocessor being supplied with said non-linear signal in a digital form for carrying out digital computation on the basis of said non-linear signal.

2. A control system for an internal combustion engine as claimed in claim 1, wherein the output signal of said air flow meter provides a desired resolution for intake air over the entire range of the flow rate of intake air when said output signal is processed with a limited number of bits required for said microprocessor for the control of the controlled variables of the engine.

3. A control system for an internal combustion engine as claimed in claim 1, wherein the output signal X of said air flow meter is substantially expressed as $X = K_1 \log Q + K_2$ where Q is the flow rate of intake air and $K_1$ and $K_2$ are constants.

4. A control system for an internal combustion engine as claimed in claim 1, wherein the output signal X of said air flow meter is substantially expressed by a function of the liquadratic root of Q, where Q is the flow rate of intake air.

5. A control system for an internal combustion engine as claimed in claim 1, wherein said non-linear signal producing means comprises a heater means disposed in the flow of intake air, the temperature of said heater means changing according to the flow rate of intake air; a sensing means for producing an output signal in accordance with a change in the temmperature of said heater means; an integrating means for integrating the output signal of said sensing means; and a square-root circuit means receiving an output of said integrating device for producing said non-linear signal on the basis of the output of said integrating means.

6. A control system for an internal combustion engine as claimed in claim 1, wherein said non-linear signal producing means comprises heater means disposed in the flow of intake air, the temperature of said heater means changing according to the flow rate of intake air; sensing means for producing an output signal in accordance with a change in the temperature of said heater means; a control signal producing means for producing a control signal in response to the output signal of said sensing means; a current control means for controlling a current flowing through said heater means in accordance with the control signal of said control signal producing means to maintain the temperature of the heater means constant; and an output means for producing said non-linear signal on the basis of the controlled current.

7. A control signal as claimed in claim 6, wherein said non-linear signal producing means further comprises detecting means for detecting the signal produced from said output means and producing an output signal when detecting a predetermined level of said detected signal, and an adjusting means for adjusting the sensing level of said sensing means, in accordance with the output signal of said detecting means.

8. A control system for an internal combustion engine as claimed in claim 1, 2, 3, 4, 5, 6, or 7 wherein said fuel flow rate control means includes a magnetic means energized in accordance with said fuel flow rate control signal produced from said microprocessor, and said fuel supply means includes a valve means disposed in a flow path of the fuel and operating in response to the energization of said magnetic means.

9. A control system for an internal combustion engine as claimed in claim 1, 2, 3, 4, 5, 6, or 7 wherein said microprocessor carries out digital computation to obtain said fuel flow rate control signal as a signal having said non-linear characteristic, and said control system further comprises means for converting said fuel flow rate control signal into a linear signal proportional to the flow rate of intake air.

10. A control system for an internal combustion engine as claimed in claim 9, wherein said converting means includes means delimiting an opening allowing flow of fuel to be supplied to the engine, a cam means having a profile determined according to said non-linear characteristic and driven in accordance with said fuel flow rate control signal, and a movable means driven by said cam means for adjusting the area of the opening in accordance with the profile of said cam means.

11. A control system for an internal combustion engine as claimed in claim 9, wherein said converting means includes means delimiting an opening allowing flow of fuel to be supplied to the engine and having a profile determined according to said non-linear characteristic, a cam means driven in accordance with said fuel flow rate control signal, and a movable means driven by said cam device for at least partially closing the opening.

*12. A control system for an internal combustion engine comprising: an air flow meter for metering the flow rate of*

*intake air supplied to the engine and for producing an output signal relative to the flow rate of intake air; a plurality of sensors for detecting different conditions of engine operation; a microprocessor for carrying out digital computation on the basis of the output signal of said air flow meter and the output signals of said sensors thereby providing at least one control signal for the engine; fuel supply means for supplying fuel to the engine; and fuel flow rate control means for controlling the flow rate of fuel supplied by said fuel supply means according to said control signal; wherein said air flow meter includes means for producing, as said output signal relative to the flow rate of intake air, a non-linear signal having a continually-increasing non-linear characterstic with increase in flow rate such that the changing rate of said signal with respect to the flow rate of intake air is greater in a predetermined region in which the flow rate of intake air is smaller than in other regions of the flow rate of intake air, said microprocessor being supplied with said non-linear signal in a digital form for carrying out digital computation on the basis of said non-linear signal.*

*13. A control system for an internal combustion engine comprising: an air flow meter for metering the flow rate of intake air supplied to the engine and for producing an output signal relative to the flow rate of the intake air; a plurality of sensors for detecting different conditions of engine operation; a microprocessor for carrying out digital computation on the basis of the output signal of said air flow meter and the output signals of said sensors thereby providing a plurality of control signals for controlling the controlled variables of the engine, fuel supply means for supplying fuel to the engine; and fuel flow rate control means for controlling the flow rate of fuel supplied by said fuel supply means according to a fuel flow rate control signal among the control signals; wherein said air flow meter includes means for producing, as said output signal relative to the flow rate of intake air, a non-linear signal having a continually-increasing non-linear characteristic with increase in flow rate such that the changing rate of said signal with respect to the flow rate of intake air is greater in a predetermined region in which the flow rate of intake air is small than in other regions of the flow rate of intake air, said control system further comprising means for converting said non-linear signal to a digital form, said microprocessor being supplied with said non-linear signal in a digital form for carrying out digital computation on the basis of said non-linear signal.*

*14. A control system for an internal combustion engine comprising: an air flow meter for metering the flow rate of intake air supplied to the engine and for producing an output signal relative to the flow rate of intake air; a plurality of sensors for detecting different conditions of engine operation; a microprocessor for carrying out digital computation on the basis of the output signal of said air flow meter and the output signals of said sensors thereby providing at least one control signal for the engine; fuel supply means for supplying fuel to the engine; and fuel flow rate control means for controlling the flow rate of fuel supplied by said fuel supply means according to said control signal; wherein said air flow meter includes means for producing, as said output signal relative to the flow rate of intake air, a non-linear signal having a non-linear characteristic such that the changing rate of said signal with respect to the flow rate of intake air is greater in a predetermined region in which the flow rate of intake air is smaller than in other regions of the flow rate of intake air, said control system further comprising means for converting said non-linear signal to a digital form, said microprocessor being supplied with said non-linear signal in a digital form for carrying out digital computation on the basis of said non-linear signal.*

* * * * *